Dec. 15, 1942.   H. KUPPENBENDER   2,305,294
CAMERA
Filed Dec. 1, 1939

Inventor:
Heinz Küppenbender
By: Singer, Ehlert, Stern & Carlberg
Attys.

Patented Dec. 15, 1942

2,305,294

UNITED STATES PATENT OFFICE 2,305,294

CAMERA

Heinz Kuppenbender, Dresden, Germany; vested in the Alien Property Custodian

Application December 1, 1939, Serial No. 307,165 In Germany October 5, 1938

6 Claims. (Cl. 95—10)

This invention relates to improvements in cameras, and especially in cameras provided with photoelectric exposure meters.

It is an object of the invention to provide a camera with an electric exposure meter and with exposure control elements, as for instance, shutter and diaphragm, and to facilitate the check-up of the adjustment of the control exposure elements with respect to the reading of the exposure meter.

Another object of the invention is to provide a photoelectric exposure meter in association with exposure control elements in which the proper adjustment of the exposure control elements may be ascertained without alteration of the conditions in the circuit of the photoelectric exposure meter.

The invention also has the object of providing in a camera, a photoelectric exposure meter and exposure control elements which are adjustable in accordance with the reading induced in the exposure meter by the intensity of the light striking the same without necessitating the insertion of variable resistances in the circuit of the exposure meter.

Another object of the invention is to provide a camera with a photoelectric exposure meter and exposure control elements which are connected with the exposure meter by differential gearing, whereby the actuation of an indicator in the electric exposure meter may be effected without necessitating the operation of a diaphragm for the photoelectric cell or without necessitating the provision of any other means for altering the resistance of the photoelectric cell.

Another object of the invention resides in the provision of a camera with a built-in photoelectric exposure meter and exposure control elements on the camera, the latter being connected with the indicator of the exposure meter by differential gearing permitting adjustment of the indicator in the exposure meter by one or more of the exposure control elements of the camera without affecting the operative connection of the other exposure control element or elements with the indicator.

With these and numerous other objects in view, an embodiment of the invention is illustrated in the accompanying drawing, to which reference is made in the following specification.

Figure 1:
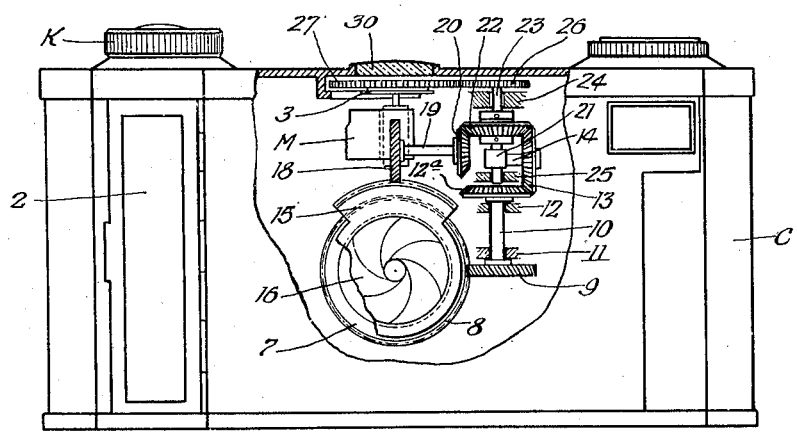
Fig. 1 is an elevation of a camera, a wall portion of which is shown broken away to illustrate in section and elevation parts in the interior of the camera.

In photographic cameras or motion picture cameras having a photoelectric exposure meter, the exposure control elements as the shutter setting element or the diaphragm adjusting element are usually operated by hand while observing the indications of the photoelectric exposure meter. In some instances these exposure control elements were connected with means for varying the photoelectric current emanating from the photosensitive cell which forms a part of the electric exposure meter. Owing to this variation of the current, the position of the electric indicator was varied, and when this position of the indicator had been adjusted, the operator knew that the exposure control elements also had been set to the proper values. The variation of the circuit conditions in the photoelectric exposure meter were induced either by varying resistances within the circuit in accordance with the movement of the exposure control elements or by altering the area of the photoelectric cell effective for inducing the flow of current in the exposure meter.

It also had been proposed to associate the exposure control elements with an auxiliary indicator and to leave the circuit conditions in the photoelectric exposure meter unaltered by the adjustment of the exposure control elements. The second indicator was moved by the operation of the exposure control elements to predetermined relation with respect to the first indicator to show the proper adjustment of the exposure control elements. This second method of setting the exposure control elements to their proper relation with respect to each other and with respect to the light conditions indicated by the exposure meter has the advantage of utilizing constant circuit conditions in the exposure meter and of eliminating regulating resistances within the circuit or diaphragms for the photoelectric cell of the exposure meter.

The present invention pertains to a camera in which the adjustment of the photoelectric exposure meters is effected in accordance with the second method set out above. The invention as illustrated by way of example, is shown as comprising a casing C for a camera having the usual lens mount O with which a diaphragm setting ring D may be combined. The means for focusing the lens as by axial adjustment of the lens mount or in some other way, do not form part of the present invention, and are not illustrated in the drawing. The specific means for setting the shutter to a selectively determined speed also do not form a part of the present invention and may be manipulated for instance by a knob K which is shown on top of the camera so as to be readily accessible. The shutter setting means and the diaphragm setting means constitute the exposure control elements of the camera.

The photoelectric exposure meter built into the camera comprises a photoelectric cell 1 which may be covered by a lid 2, as shown in Fig. 1, when the device is not in use. The exposure meter, furthermore, comprises a galvanometer of the usual type, as shown at M, and having an indicator 3 rotatably mounted in the instrument to be moved in accordance with the intensity of the light striking the photoelectric cell 1. The photoelectric exposure meter is of that type in which a photoelectric current is created upon energization of the photoelectric cell 1 by light, this electric current then effecting a pivotal movement of the indicator 3. For this purpose the photoelectric cell is connected with the galvanometer M by the conductor 4, and other conductors 5, and 6, respectively leading from the cell and from the galvanometer respectively to ground complete this circuit. While in some types of cameras the resistances in this circuit were varied in accordance with the adjustment of exposure control elements, the circuit conditions in the present application remain constant and solely dependent upon the intensity of the light energizing the cell 1.

The exposure control element formed by the means for setting the shutter to the desired speed include in the present embodiment a disc 7 which is provided with one or more circumferentially extending helical ribs adapted for engagement with a helical gear 9 fixedly secured to a shaft 10 which is supported within bearings 11 and 12 in the interior of the camera housing C. The shaft 10 carries fixedly at its upper end a bevel gear 12ª in engagement with a planetary bevel gear 13 carried on a short shaft 14 extending at right angle to the first named shaft 10.

A second exposure controlling element is formed by an arcuate extension 15 rotatable about the optical axis of the system and connected with the diaphragm 16 in a known way in such manner that upon rotation of the arcuate extension 15, the opening formed in the diaphragm 16 will be reduced or enlarged. The arcuate extension 15 also is provided with a circumferentially extending helical cam or rib in engagement with a helical gear 18 secured to a shaft 19 in the interior of the camera and provided at the other end with a bevel gear 20. The bevel gear 20 is in engagement with a companion bevel gear 22 mounted loosely on a shaft 23 which carries the bearing 21 from which the shaft 14 for the planetary gear 13 extends.

The described elements, therefore, constitute a differential gearing permitting the planetary gear 13 to be actuated either from the exposure control element 7 or from the exposure control element 15. Upon actuation from the exposure control element or shutter setting disc 7, the helical gear 9 and bevel gear 12ª are rotated, and since the planetary gear 13 is in engagement with the bevel gear 22, then held stationary owing to its mesh with the bevel gear 20, the planetary gear 13 is revolved about an axis in alinement with the shaft 10. The bearing 21 is fixedly secured to a shaft 23 which is supported in bearings 24 and 25 and which carries loosely the bevel gear 22 while it carries fixedly at its top the spur gear 26. The spur gear 26, therefore, will be rotated upon rotation of the exposure controlling element 7.

When the other exposure control element 15 is rotated, the planetary gear 13 also is revolved while in engagement with the bevel gear 22, and shaft 23, therefore, with its spur gear 26 may be rotated in this manner.

The spur gear 26 actuates a secondary indicator 27 of the photoelectric exposure meter. This second indicator is formed in the embodiment illustrated as a spur gear in mesh with the spur gear 26 so as to be operated thereby and is constructed as a transparent disc. As shown in the drawing, it overlies very closely the first named indicator 3 of the exposure meter which likewise may be constructed as a rotary disc.

Figure 2:
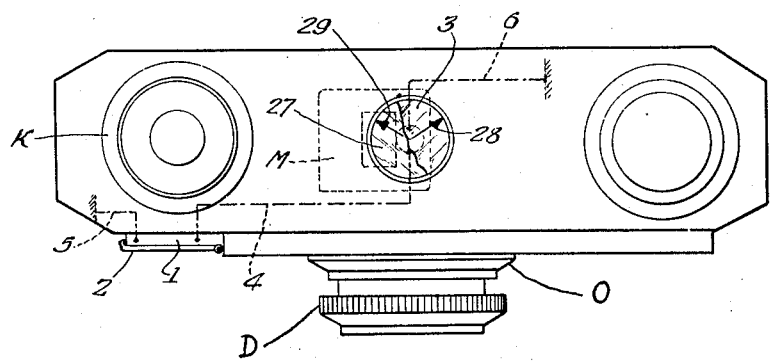
Fig. 2 is a top plan view of the camera.

As shown in Fig. 2, one of these indicators, as for instance, the primary indicator 3, is provided with a mark or index 28 which will be visible through the transparent second indicator 27, no matter how great the deflection imparted to the indicator 3 may be upon energization of the photoelectric cell 1. The second indicator 27 also may be provided with a mark 29, and it is obvious, therefore, that the two marks 28, 29 may be moved to register with each other or they may be moved to any other desired predetermined relation. This movement of the second indicator to the desired relation with respect to the first indicator may be effected by successive actuation of the exposure control elements and the differential gearing associated therewith or by simultaneous adjustment of these two exposure control elements. Upon the marks 28, 29 having reached the desired relation, as for instance, the optical registry, the user will know that the exposure control elements have been properly adjusted for making a successful exposure under the light conditions then prevailing.

The top of the camera also is provided with a magnifying lens 30 directly on top of the transparent indicator 27 permitting thereby the user of the camera to check up the relation of the indicator marks 28, 29 without any great effort.

In operation the user may for instance, desiring to make a picture of a certain focal depth, adjust the exposure control element 15 to attain this depth, thereby imparting through the differential gearing a movement to the second indicator 27 of the exposure meter. By adjustment of the other exposure control element 7 which may be induced by the knob K or by other instrumentalities, not shown, the second indicator 27 again is moved through the differential gearing described and when the mark 29 on said second indicator is in optical registration with the mark 28, as ascertained through the lens 30, the camera is properly adjusted.

Obviously the user also may first effect adjustment of the exposure control element 7 and then adjust the diaphragm 16 until the registry of the marks 28, 29 is attained. Again, it is obvious that the two exposure control elements may be adjusted simultaneously.

I claim:

1. In combination with a camera, an exposure meter having a photoelectric element affected by the intensity of the light, a current actuated rotary indicator movable in accordance with the intensity of the light, a second gear controlled rotary indicator, one of said rotary indicators being in the form of a transparent rotary disc provided with a mark to permit the position of the other indicator with respect to said mark to be ascertained therethrough, exposure control elements manually adjustable independently of each other, and a differential gearing interposed between said exposure control elements and said gear controlled indicator for rotatably adjusting said second gear controlled indicator with respect to said current actuated indicator independent of the position of said last mentioned indicator, said differential gearing including a shaft drivingly connected with the gear which rotates said second indicator, a sun gear loosely rotatable on said shaft, a gear meshing with said sun gear and operatively connected by means of a worm gearing with one of said exposure control elements, a second sun gear operatively connected by means of another worm gearing with said other exposure control element, a planetary gear meshing with both said sun gears, and means for supporting said planetary gear on said shaft for rotating the latter whenever said planetary gear is actuated by either one of said sun gears.

2. In combination with a camera, an exposure meter having a photoelectric element adapted to set up a flow of current in a circuit connected with said element, a current actuated rotary indicator in the form of a circular disc movable in accordance with the intensity of the light energizing the photoelectric element, exposure control elements manually adjustable independently of each other, a differential gearing independently actuated by said exposure control elements upon operation thereof, and a second indicator in the form of a circular transparent disc in axial alinement with said first named disc, said second rotary indicator having teeth in engagement with a gear driven by said differential gearing, whereby the gear controlled indicator may be moved through actuation of either one of said exposure control elements to any predetermined relation with respect to said first named current actuated indicator, said differential gearing including a shaft drivingly connected with the gear which rotates said second indicator, a sun gear loosely rotatable on said shaft, a gear meshing with said sun gear and operatively connected by means of a worm gearing with one of said exposure control elements, a second sun gear operatively connected by means of another worm gearing with said other exposure control element, a planetary gear meshing with both said sun gears, and means for supporting said planetary gear on said shaft for rotating the latter whenever said planetary gear is actuated by either one of said sun gears.

3. In combination with a camera, an exposure meter having a photoelectric element adapted to set up a flow of electric current in a circuit connected with said element, a current actuated rotary indicator in the form of a disc having an index mark and movable in accordance with the intensity of the light energizing the photoelectric element, exposure control elements manually adjustable independently of each other, a second gear controlled rotary indicator, a differential gearing interposed between said exposure control elements and said gear controlled indicator for moving the gear controlled indicator with respect to the current actuated indicator independent of the flow of current in the circuit of the photoelectric element, said differential gearing including a shaft drivingly connected with the gear which rotates said second indicator, a sun gear loosely rotatable on said shaft, a gear meshing with said sun gear and operatively connected by means of a worm gearing with one of said exposure control elements, a second sun gear operatively connected by means of another worm gearing with said other exposure control element, a planetary gear meshing with both said sun gears, and means for supporting said planetary gear on said shaft for rotating the latter whenever said planetary gear is actuated by either one of said sun gears, the two indicators being in alinement with each other and the second indicator being in the form of a transparent disc overlying the first named indicator and a lens in the camera above said second named transparent gear controlled indicator adapted to facilitate accurate observation of the position of said indicators.

4. In a photographic camera, the combination of a photoelectric exposure meter provided with a rotary indicator, two manually adjustable exposure control elements for selectively varying the speed of the shutter and the size of the diaphragm aperture respectively, a second rotary indicator provided with gear teeth, and a differential gearing connecting said two manually adjustable exposure control elements with said second rotary indicator for rotating the latter relatively to said first named electrically operated rotary indicator whenever either one of said exposure control elements is actuated, said differential gearing including a shaft, a gear fixedly mounted on said shaft and meshing with the gear teeth on said second rotary indicator, a sun gear loosely rotatably mounted on said shaft, a gear meshing with said sun gear and operatively connected by means of a worm gearing with one of said two exposure control elements, a second sun gear operatively connected by means of another worm gearing with the other exposure control element, a planetary gear meshing with both said sun gears, and means for supporting said planetary gear on said shaft so that the latter is rotated whenever said planetary gear is actuated by either one of said sun gears.

5. In a photographic camera, the combination of a photoelectric exposure meter provided with a rotary indicator, two manually adjustable exposure control elements for selectively varying the speed of the shutter and the size of the diaphragm aperture respectively, a second rotary indicator, and a differential gearing connecting said two manually adjustable exposure control elements with said second rotary indicator for rotating the latter relatively to said first named electrically operated rotary indicator whenever either one of said exposure control elements is actuated, said differential gearing including a shaft drivingly connected with said second rotary indicator, a sun gear loosely rotatably mounted on said shaft, a gear meshing with said sun gear and operatively connected by means of a worm gearing with said diaphragm aperture control element, a second sun gear operatively connected by means of another worm gearing with said shutter speed control element, a planetary gear meshing with both said sun gears, and means for supporting said planetary gear on said shaft so that the latter is rotated whenever said planetary gear is actuated by either one of said sun gears.

6. In a photographic camera, the combination of a photoelectric exposure meter provided with a rotary indicator, two manually adjustable exposure control elements for selectively varying the speed of the shutter and the size of the diaphragm aperture respectively, a second rotary indicator arranged in axial alinement with said first mentioned rotary indicator, and a differential gearing connecting said two manually adjustable exposure control elements with said second rotary indicator for rotating the latter relatively to said first named electrically operated rotary indicator whenever either one of said exposure control elements is actuated, said differential gearing including a shaft drivingly connected with said second rotary indicator, a sun gear loosely rotatably mounted on said shaft, a gear meshing with said sun gear and operatively connected by means of a worm gearing with one of said two exposure control elements, a second sun gear operatively connected by means of another worm gearing with the other exposure control element, a planetary gear meshing with both said sun gears, and means for supporting said planetary gear on said shaft so that the latter is rotated whenever said planetary gear is actuated by either one of said sun gears.

HEINZ KUPPENBENDER.